2,809,081

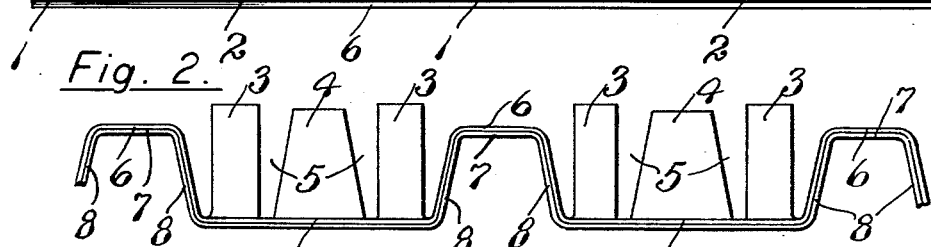
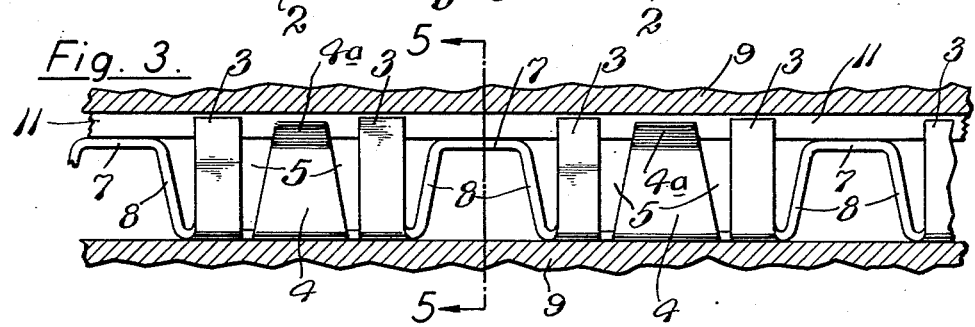
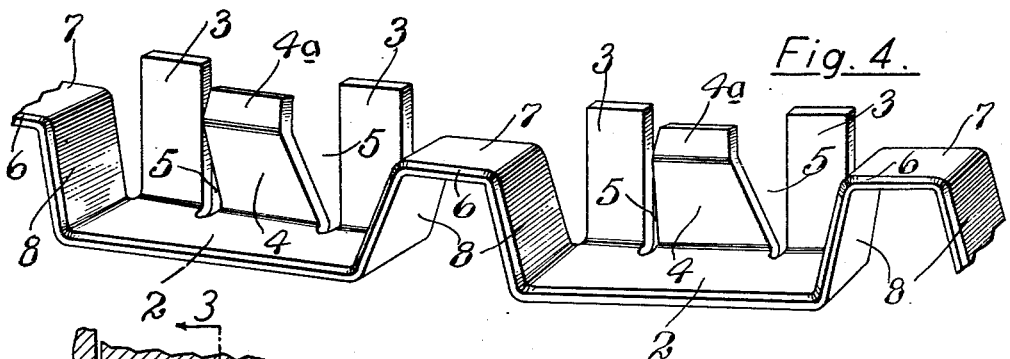
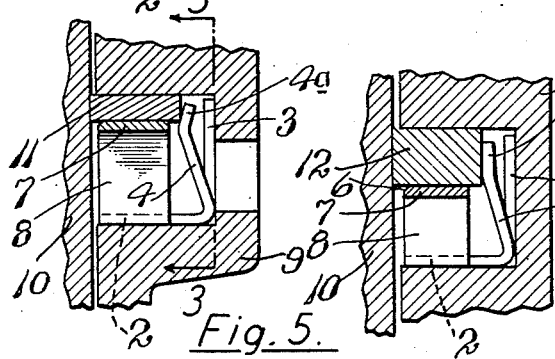
Inventor
Holly M. Olson
By Frank E. Liverance, Jr.
Attorney

United States Patent Office 2,809,081
Patented Oct. 8, 1957

FRICTION FREE EXPANDER SPACER PISTON RING

Holly M. Olson, Muskegon, Mich., assignor to Sealed Power Corporation, Muskegon, Mich., a corporation of Michigan Application June 4, 1956, Serial No. 589,334

6 Claims. (Cl. 309—45)

The present invention relates to piston rings and is particularly concerned with a novel structure of ring support and expander which will carry a piston ring in a manner so that it is free of friction, with no retarding of movement of the ring so that it will follow the cylinder bore under all conditions, maintaining the ring in sealing engagement with the cylinder bore not only when it is new but after it is worn and the surface of the bore has changed.

In internal combustion engines and, particularly those used with motor vehicles, one of the essential requirements of a piston ring is an ability to respond instantaneously to engine acceleration as the engine is speeded up to quickly accelerate and move the motor vehicle with increasing speeds. Lightness of pistons, as much as can be obtained, and of its associated parts is necessary, such piston and associated parts operating at high speed and the piston changing direction as it reciprocates in a cylinder, stopping at each end of the cylinder and accelerating with enormous speed from stopping to full speed and then slowing down to stop at the opposite end of the piston stroke.

For rings to positively seal under such conditions of speed and acceleration, high tension rings are required to which is added the force of an expander placed between the inner side of the ring and the bottom of the piston ring groove in which installed. The conventional corrugated hump expander has a multiple of spaced humps which alternately bear against the piston ring and bottom of the ring groove. The inner and outer movements of the piston ring in the attempt thereof to follow the interior surface of the cylinder bore, results in slippage, change of position of the humps with respect to the piston ring, with resulting friction between the ring and expander which prevents the ring from adjusting uniformly to the cylinder bore in which located, particularly at high speeds of operation. Because of such slippage of the expander humps or crimps against the piston ring there is wear which, particularly in the expander, results in deterioration of the expander with increasing slippage between the expander and ring causing a dampening effect on the ring which is detrimental to proper sealing.

One primary object of the present invention is to overcome slippage and friction, the ring being entirely free in its action. Such result is obtained by a structure having a large number of semi-elliptical leaf spring members engaging the inner side of the piston ring with direct outward friction free pressure, making the piston ring instantly responsive to all cylinder bore variations and with a positive seal of the piston ring against the cylinder walls to eliminate waste of oil and fuel and maintain power without decrease thereof.

With my invention the spacer supports the piston ring used with a maximum support where most needed. Unlike other expanders now largely in use, such ring spacer support has its semi-elliptical spring members operate independently of each other, the ring being forced and moved outwardly with pressure from said spring members with no corresponding movement of the spacer. The ring is supported over a greater supporting area, equaling nearly the full width of the piston ring while such supporting ring spacer with integral, independently operating expanding, semi-leaf springs is firmly against the lower side and the bottom of said ring groove, being held firmly thereagainst.

It is a further object and purpose of my invention to provide such supports maintained stationary with respect to the piston ring used therewith, with independently operated spring members acting on the piston ring to force it outwardly at a much increased number of closely spaced points of engagement than with ordinary expanders, and without slippage between the ring engaging spring elements and the piston ring, with instant response and necessary movement of the piston ring to follow and seal against the inner surface of the cylinder bore irrespective of irregularities of the cylinder bore surface due to wear in use.

With my invention also, the semi-elliptic spring members engaging the piston ring may act thereon to better seal the upper side of the ring against the upper side of the piston ring groove in which installed.

Further, with my invention a better support for the piston in its reciprocatory movements and a maintenance of the piston with its vertical axis parallel to the axis of the cylinder bore is obtained against the tendency of the piston to tilt about the wrist pins and the crankshaft of the engine. Outward pressure of the large number of semi-elliptic springs bearing against the ring provides a stabilizing effect in guiding against rocking action of the piston. Such maintenance of the piston against tilting or rocking action is becoming more and more imperative as pistons are increased in diameter and the length thereof, particularly as the depending piston skirt, is decreased.

My invention may be used either as an oil ring with thin steel ring members usually known as rails generally of not over .025" in thickness, or with a cast iron compression ring member, my invention being very useful in either case.

A preferred structure in which my invention is made is illustrated in the accompanying drawing and an understanding of the invention and the manner in which the recited desirable effects and results are obtained may be obtained from the description accompanying the drawing, in which drawing, Fig. 1 is a fragmentary plan view of a length of thin metallic spring material as it is cut and formed by a punch press through which said length of material is fed, the length of material having the shape and form shown in Fig. 1 resulting in the first step of the operation.

Fig. 2 is a fragmentary outer elevation or edge view of the expander spacer structure of my invention made from the material after the first step of operation shown in Fig. 1, being shaped into a ring support having a continuous corrugated form and made circular, with adjacent ends normally spaced a short distance at the gap or parting therein, and with the ring groove bottom engaging members and the piston ring semi-leaf spring members bent upwardly generally at right angles to the lower sides of said corrugated spacer support.

Fig. 3 is a vertical section substantially on the plane of line 3—3 of Fig. 5, showing an inner elevation of a piston ring assembled with the spacer expander of my invention in association therewith.

Fig. 4 is a fragmentary perspective view of a portion of the length of the spacer expander support of my invention when completely formed, and Figs. 5 and 6 are fragmentary transverse vertical sections through a piston with a piston ring in a ring groove thereof, Fig. 5 showing a thin rail piston ring member such as used in oil ring grooves, and Fig. 6 a thicker piston ring used in conventional compression ring grooves.

Like reference characters refer to like parts in the different figures of the drawing.

In producing my invention, a length of thin flat metallic spring material is cut and formed generally by punch press operations to leave a continuous narrow width of such material in alternate integral sections 1 and 2 as shown in Fig. 1. From each section 2, two spaced tongues 3 extend, between which is a semi-elliptic spring member 4 spaced from the adjacent edges of the two tongues by slots 5 as shown. The intermediate spring member 4 at its free end portion may be bent at an angle from the body of the member 4 in a terminal lip 4a as in Fig. 5, or at a lesser angle in a terminal lip 4b as in Fig. 6.

Such tongues 3 and intermediate spring member 4 are bent so that the tongues 3 are disposed at right angles to the section 2 with which integrally connected, and the main body of the spring member 4 is at an acute angle to such section 2, outwardly from the tongues 3. The lip 4a extends upwardly at an acute angle to the vertical while the lip 4b lies substantially in a vertical plane. To make the spacer expander structure suitable for use with piston rings, a preselected length is bent and shaped into ring form with the ends approaching each other to make a parting or gap, well known in piston ring construction. The continuous longitudinal edge of the strip from which the spacer expander structure is made may be beveled as at 6 though such beveling thereof is not essential for the working of my invention; and instead of beveling, such edge may be rounded into conventional arcuate form instead.

The connecting sections 1, which are longer than the sections 2 and which alternate with the sections 2, are pressed upwardly into generally inverted U-form having horizontal upper sides 7 and downwardly diverging legs 8. This completes the ring supporting spacer expander member, the tongues 3 extending above the horizontal sections 7, as do lips 4a and 4b likewise.

In use, such circular ring supporting spacer and expander is inserted in a piston ring groove around an internal combustion piston 9, the sections 2 lying against the lower side of the ring groove and the tongues 3 against the bottom thereof. The horizontal sections 7 are spaced from the upper side of the ring groove a distance such that, for example, a thin, circular parted ring member 11, which may be of any suitable material and which generally is of thin steel, is located over all of the horizontal supporting sections 7 between them and the upper side of the ring groove. At its inner curved edge it bears against the inclined tongues 4a of the semi-elliptic springs 4. Such thin parted ring member or rail 11, upon the installation of a piston equipped with such piston ring within a cylinder 10 is forced inwardly against the lips 4a of the spring members 4 and the resistance of such spring members 4, caused by their being bent inwardly, will re-act against the ring members or rails 11 to maintain them at their outer curved edges against the wall of the cylinder. The upward and inward inclination of lips 4a will act to tend to move a rail 11 upwardly at its inner portion to provide a more perfect seal against oil passage between a rail 11 and the upper side of the ring groove.

In Fig. 6 the piston ring 12 is of greater thickness, is generally made of cast iron, and lips 4b located in vertical planes lie substantially flat against the inner curved sides of the ring. The horizontal supporting sections 7 are at a lower level than when used with the thinner rail 11 and the legs 8 are correspondingly shortened. In Fig. 5 where a thin rail 11 is shown, the assembled ring structure is particularly useful in connection with the lowermost oil grooves in a piston having drainage openings to the interior of the piston for escape of excess oil, while in the assembled ring structure of Fig. 6 the rings are adapted to be used in the higher compression ring grooves of the piston.

With the structure as described the spacer expander ring supporting structure is held against relative movement with respect to the piston, the lower horizontal sections 2 bearing against the lower side of the ring groove and the tongues 3 against the bottom thereof. Springs 4 with their lips 4a or 4b are independent of each other and act independently upon the rail 11 or the ring 12 whichever may be used. In some cases two rings 11 may be used instead of a single one. The independently acting semi-elliptic springs, in numbers around a ring spacer and support, are increased over the inner ring engaging humps of the usual corrugated rib expander. There is no slippage of the spring members with respect to such rail or ring members and no dampening, friction induced action because of slippage. All of the advantages and results recited are obtained in the very practical, useful and simply and economically produced structure shown and described.

The invention is defined in the appended claims and is to be considered comprehensive of all forms of structure coming within their scope.

I claim:

1. Structure as described comprising, a continuous band of thin metallic material in circular form parted at one side, corrugated to make a plurality of flat lower sections in the same plane, and a plurality of flat upper sections connected therewith and located in a plane parallel to the plane of the first mentioned sections and spaced upwardly therefrom and alternating therewith, vertical tongues extending upwardly from the inner edges of said lower sections at right angles thereto, and spring members upwardly and outwardly inclined from the inner edges of said lower sections, said spring members extending above said upper sections.

2. Structure as defined in claim 1, and a circular parted piston ring lying against the upper sides of said upper sections and pressed against at its inner edges by said spring members.

3. Structure as described comprising, a continuous, corrugated band of thin spring metallic material in circular form parted at a side thereof, having a plurality of spaced flat lower sections in the same plane, and inverted, generally U-shaped portions alternating with said lower sections integral therewith, each U-shaped portion comprising an upper flat section and downwardly extending legs at the ends of said upper sections connecting with the ends of adjacent lower flat sections, all of said upper flat sections lying in the same plane, a pair of spaced vertical tongues integrally connected with each of said lower flat sections extending upwardly at right angles thereto from the inner edges of associated flat sections, and an integral spring member between each pair of tongues connected to and inclined upwardly and outwardly from the inner edge of each lower flat section, said spring members extending above said upper flat sections.

4. Structure as defined in claim 3, each of said spring members, at its upper end portion terminating in a lip inclined inwardly from the remaining portion of its associated spring member.

5. Structure as described comprising, a circular corrugated, continuous band of thin, spring metallic material, parted at a side thereof, having a plurality of spaced flat lower sections in the same plane adapted to lie against the lower side of a piston ring groove, and inverted, generally U-shaped portions between and integrally connecting said lower sections, said U-shaped portions having flat upper surfaces in the same plane parallel to the plane of said lower sections, a spring member integral with and at the inner edge of each lower section extending upwardly and inclining outwardly at an angle to the vertical, and means connected to the inner edge of each lower section extending vertically therefrom adapted to lie against the bottom of a piston ring groove.

6. Structure as defined in claim 5, each of said spring members terminating at its upper end in a lip inclined inwardly at an angle to the body of the spring member with which associated, and a circular, parted piston ring lying upon and supported by said inverted U-shaped portions outwardly of the upper end portions of said spring members, and pressed against thereby by said lips bearing against the lower, inner corner portions of said ring.

No references cited.